UNITED STATES PATENT OFFICE.

FREDERIC R. MILLER, OF BROOKLYN, NEW YORK, ASSIGNOR, BY DIRECT AND MESNE ASSIGNMENTS, TO ART COLOR MOTION PICTURE CO., OF NEW YORK, N. Y., A CORPORATION OF ARIZONA.

COLOR CINEMATOGRAPHY.

1,389,963.        Specification of Letters Patent.      Patented Sept. 6, 1921.

No Drawing. Application filed January 6, 1914, Serial No. 810,680. Renewed February 8, 1921. Serial No. 443,496.

*To all whom it may concern:*

Be it known that I, FREDERIC R. MILLER, a citizen of the United States, residing at Brooklyn, in the county of Kings and State of New York, have invented new and useful Improvements in Color Cinematography of which the following is a specification.

The present invention relates broadly to colored transparencies. Specifically the invention has to do with the coloring of photographically obtained designs arranged on the surface of a base of transparent or translucent material, as for instance the designs which go to make up a moving picture film.

Heretofore in the manufacture of multicolored moving picture films, the colors were applied to the designs by stenciling. Now it will be obvious that the operation of stenciling, even though performed mechanically, is by reason of the machinery employed and the time and care required to apply the different colors, an expensive procedure. That this is true is evidenced by the fact that the cost of a multi-colored film greatly exceeds that of the ordinary black and white film. Various attempts have been made to reduce the cost between the two types of films just mentioned, but these attempts have resulted, in instances where reduction in cost has been had, merely in coloring the picture on projection. In other words the attempts did not have for their object to produce a colored motion picture film.

It is now a well known fact that ideally artistic motion pictures in multi-color can be had only when the designs on the film itself are colored. Otherwise lapping of the colors will be had as in instances where screens of different colors are passed rapidly through a beam of projected light. Aside from the absence of artistic coloring effect in pictures obtained with different colored screens, the cost to produce these pictures while not as great as the cost of a multicolored film is nevertheless equal to twice the cost of the ordinary black and white picture. This is because of the physical law on which this principle of projection is founded and which requires that the film used must be so proportioned as to contain a number of pictures equal to twice that which is necessary for ordinary black and white projections.

Coming now to the present invention the object thereof is to produce in multi-color a transparency or moving picture film at approximately no greater cost than would be required to produce a transparency or moving picture film in black and white. And to this end the invention resides in adapting a black and white transparency design and a plurality of coloring agents to coöperate one with the other so that upon passing the former through the latter these will successively operate on predetermined portions of the design.

Other objects will appear and be better understood from that embodiment of my invention of which the following is a specification.

In its simplest form the present invention is carried out by sensitizing the surface of a base of porous material (preferably celluloid) with a suitable light sensitive solution (preferably a bicromate solution of albumin and glue) which will harden in proportion to the amount of light action it receives when exposed in connection with an ordinary black and white negative to a source of light; second, in arranging the said base together with a transparency or positive design in a photographic printing apparatus, and in making exposure in the ordinary manner; third, developing the light sensitive surface after exposure (preferably in water) whereby a negative design is obtained; fourth, submitting the said negative design to the action of a plurality of coloring agents which operate successively on the design and which are adapted in any preferred manner to operate on predetermined and substantially different portions of the design.

Each of the coloring agents employed consists of a solution of anilin dye. It has been found that the alcohol in such solution has a greater affinity for the base substance of an ordinary celluloid transparency than for the coating previously described which represents the various tones of the negative design. In the present invention where the substance of the coating forming the tones of the design consists of albumin and glue, the same is practically indissoluble in alcohol. In any event it offers a greater resistance to the action of alcohol than the base by which it is supported. But such coating dissolves readily in water and acetic acid and since these substances are also present in the ordinary stock solution of anilin dye it will be seen that the result obtained from the application to the aforesaid negative design of an alcohol solution of anilin dye, that is to say a solution containing a greater percentage of alcohol than of water and acetic acid will, when allowed to act for a required length of time, be different from that had in a corresponding length of time from the application to the said negative design of what is commonly termed a water or an acid solution of dye, or in other words a solution which contains a greater percentage of water and acetic acid than of alcohol.

Now when it is remembered that on being developed in water and after having been operated upon photographically those portions of an albumin and glue coating not acted upon by light wash off while the other portions, or those which received light action remain and harden in proportion to the amount of light action which they received during exposure, then it will be obvious that in the negative design making up the transparency of this invention there is an absence of coating in the extreme shadows and in the high light portions of the design where the coating is present the thickness thereof varies. That is to say the coating is less thick in the intermediate tones than in the high lights, or in other words the coating progressively increases in thickness from the edges of the extreme shadows to the high lights of the design. This, it will be evident, at once adapts the high lights of a design characterized as just described to resist in proportion to their densities the action of an alcohol solution of anilin dye when the same is applied thereto in any preferred manner, and permitted to act on the design for a required length of time.

In the operation of coloring a moving picture film in accordance with the principle of the present invention, the light sensitive coating is applied to one surface of the film and permitted to dry. The film is then arranged in an ordinary cinematographic printing machine in connection with an ordinary positive film. The operation of printing photographically onto the light sensitive surface is then carried out in the ordinary manner after which the film is developed as previously described. The coloring solutions are then applied successively to the negative designs in any preferred manner. A convenient procedure which may be made use of consists in providing a reel upon which the film with the negative designs to be colored is wound and which is free to rotate on a support. Placing the coloring solutions in trays and disposing these successively and in such relation to the position of the reel of film as to have the solution containing the highest percentage of alcohol nearest the reel and that containing the lowest percentage of alcohol and the highest percentage of acid or water farthest from the reel. The film is then engaged and caused to unwind from the reel and at the same time the coated surface of the film is directed into contact with the coloring agent in the first or adjacent tray. From that tray the film proceeds to the next tray and in moving thereinto the coated surface is caused to contact with he coloring agents therein. If a third or a greater number of coloring agents be employed these will be of course arranged in trays and in the same order as the two just mentioned, so that during the outward motion of the film from the reel the coated surface will contact with the coloring agents successively.

As the coated surface proceeds through the first tray and contacts with the coloring agent therein, this coloring agent by reason of having a relatively great percentage of alcohol readily attacks the extreme shadows or bare portions of the negative design and penetrates into the substance of the film or base. The coloring agent in the next succeeding tray, when the coated surface moves into contact therewith, operates first upon the relatively thin portions of the coating by dissolving these whereby the alcohol carries the second coloring agent into the pores of the base. Where three or more coloring agents are employed each will of course contain a different percentage of alcohol, water and acid from the others and the several coloring agents are then arranged in such relation to each other that considering that agent which acts on the extreme shadows as being first the percentage of alcohol in the others will progressively decrease from the first coloring agent to the last. And the percentage of water or acid will correspondingly increase from the first coloring agent to the last.

Now it will be obvious that on account of the graduated thickness of the coating the several coloring agents and frequently each of these penetrates the base for various distances and that the extent of such penetration is controlled by the time given such agent to act, or by the percentage of alcohol contained by each agent or by both, so that various tones or densities of the said color will be had.

In instances where the film is caused to move at a uniform rate of speed in unwinding from the reel and in passing into contact with the coloring agents in the trays these will be proportioned in one dimension, for instance in point of length, so that the coated surface of the film, the same moving at a uniform rate of speed, remains in contact with any coloring agent only for a predetermined length of time. With respect to the coloring agent which is the first to act on the film this time will be such as will permit the said coloring agent to penetrate the uncoated but not the coated portions unless required so to do; in that event the time given the first coloring agent to act will of course be increased. With respect to the second coloring agent the length of time given this to act on the coated surface when the same comes into contact therewith will be such as will permit the said second coloring agent to dissolve the relatively thin portions of the coating whereupon the alcohol in the solution will carry the same into the base. Where three or more coloring agents are employed each of these dissolves a portion of the coating not previously operated upon by the others, and the alcohol in the third and subsequent coloring agents carries these into the base in the manner described for the second coloring agent. Thus it will be seen that where the coated surface is submitted to the action of a plurality of coloring agents each of these acts on a portion of such surface not previously acted upon by the others.

During the operation of coloring a film in multi-color as just described overlapping, or one color merging into another may be had or prevented as desired. In instances where it is desired to obtain in any series of designs on the film the effect had by merging two different coloring agents, then of these two that which is applied second is given either a longer time to act on the several designs or it may contain a relatively great percentage of alcohol; so that in either event it will, while acting on the several designs, combine with the lighter portions of the first applied coloring agent and also with other desired portions of the base to the required extent. In this way a blending or merging one into the other of two successively applied coloring agents may be effected.

It will of course be understood that as between two or more coloring agents those first applied will operate substantially to resist, or adapt the colored portion or portions of the base to resist the subsequently applied coloring agent or agents. This resistance on the part of a colored portion or portions is undoubtedly due to the fact that in any colored portion the pores in the surface thereof are filled; consequently a subsequently applied coloring agent can not penetrate there unless given the time to do so as previously described.

From the foregoing it will have been observed that a multi-colored motion picture positive is produced in a simple, effective and expeditious manner.

It will of course be understood that the invention is susceptible of many modifications, for instance instead of preparing a colored film separate and distinct from a black and white positive as just described, an ordinary motion picture positive or negative may be taken and the coating of this invention applied on the surface thereof opposite to the design bearing surface. When a film so prepared is placed in a cinematographic printing machine and there operated upon in the manner pursued in ordinary photographic printing the coated surface will, upon development, yield negatives of the design on the opposite surface. The procedure previously explained for coloring may then be carried out in connection with the said negative designs.

In connection with the foregoing description it may be well to remember that when two or more dye solutions are used and the base material of each of which is different from the others, as for instance where the base material of one is vegetable and that of another mineral etc., then these may all contain corresponding percentages of alcohol and yet produce the result previously described. This is because that a vegetable dye for instance in solution containing forty per centum of alcohol will require a longer time to penetrate into the base than a mineral containing a corresponding percentage of alcohol. And it has been found that with other dye stuffs, the nature of whose compositions are unknown to me, a greater or less percentage of alcohol may be required to adapt these to penetrate the base in a given time than is necessary for a vegetable dye to produce a corresponding result.

What is claimed as new is:

1. A transparency comprising a base of porous material having on a surface thereof a design in multi-color, said colors being combined with the base material and those representing the shaded portions of the picture penetrating the base for a different distance from those representing the high lights of the picture.

2. A base of substantially transparent material having photographically produced pictures on its opposite faces the composition of one of said pictures being a negative of that of the other picture, one of said pictures being composed of different colors which penetrate the material of the base.

3. A base of substantially transparent material having photographically produced pictures on its opposite faces the composition of one of said pictures being a negative of that of the other picture, one of said pictures being composed of different colors which penetrate the material of the base for various distances.

4. A transparency comprising a base of porous material having on a surface thereof a design in colors, those of the colors making up the high lights of the design being combined with the base material in proportion to the clearness of the high lights.

5. A picture constituting a reproduction of an original and consisting of a base and a design thereon in color, the variations in the color in different parts of the design being in proportion to the capability of light transmission or reflection of the original.

6. A picture constituting a reproduction of an original and consisting of a base and a design thereon in color, the variations in the intensity of the color in different parts of the design being in proportion to the capability of light transmission or reflection of the original.

7. A picture constituting a reproduction of an original and consisting of a base and a design thereon in multi-color, the variations in the kind of color in different parts of the design being in proportion to the capability of light transmission or reflection of the original.

8. A picture constituting a reproduction of an original and consisting of a base and a design thereon in multi-color, the variations in the kind and intensity of the color in different parts of the design being in proportion to the capability of light transmission or reflection of the original.

9. A moving picture film constituting a reproduction of an original and consisting of a base and a series of designs thereon in color, the designs representing different stages of motion in the objects represented, the objects in the design being formed by variations in the color which variations are in proportion to the capability of light transmission or reflection of the corresponding parts of the original.

10. A moving picture film constituting a reproduction of an original and consisting of a base and a series of designs thereon in multi-color, the designs representing different stages of motion in the objects represented, the objects in the design being formed by variations in the kind and intensity of the color which variations are in proportion to the capability of light transmission or reflection of the corresponding parts of the original.

In testimony whereof I affix my signature in presence of two witnesses.

FREDERIC R. MILLER.

Witnesses:
JOHN A. DONEGAN,
GEO. A. BYRNE.